July 12, 1960 G. A. LYON 2,944,853
WHEEL COVER
Filed June 2, 1955
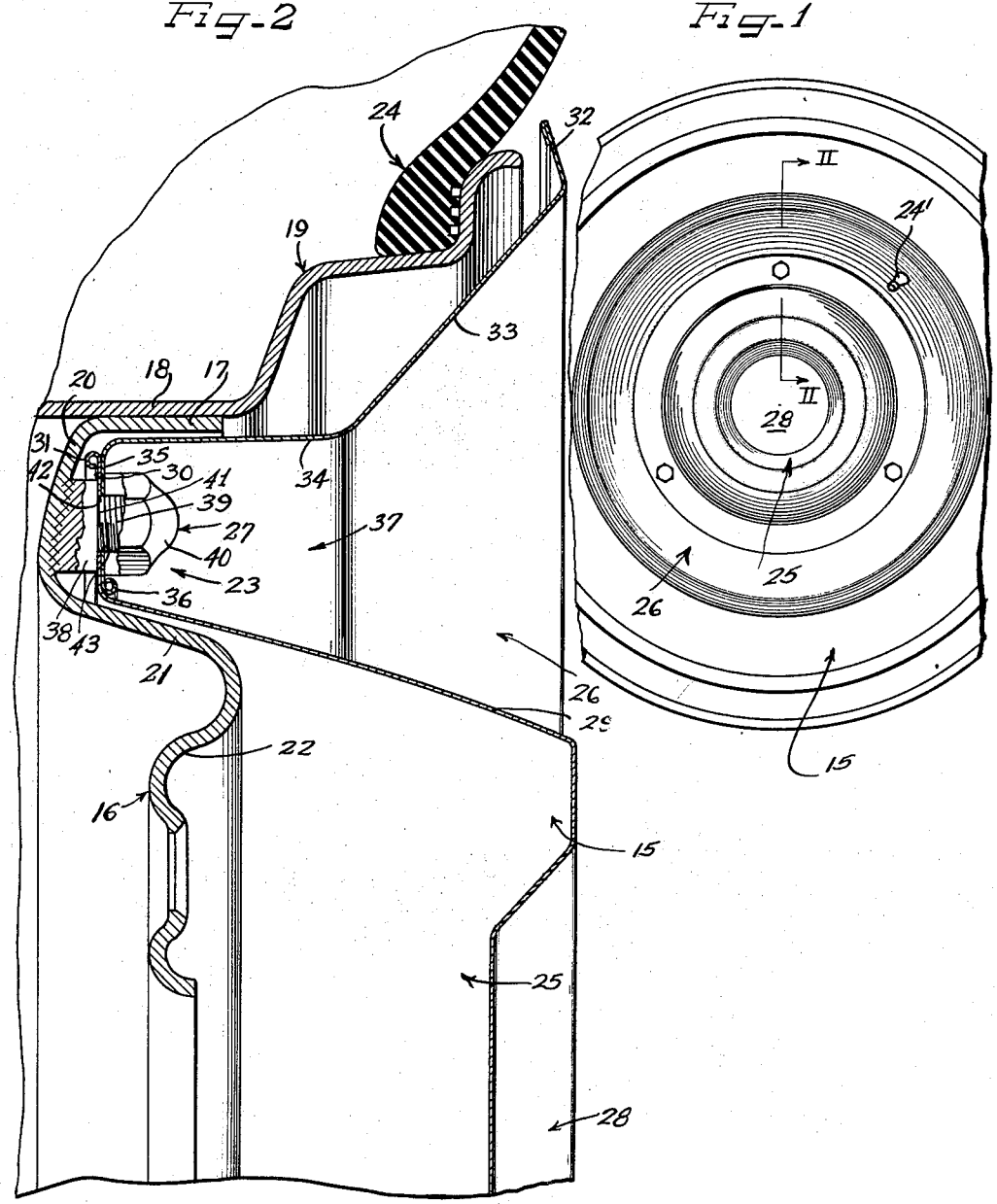
Inventor
GEORGE ALBERT LYON

United States Patent Office 2,944,853
Patented July 12, 1960

2,944,853
WHEEL COVER

George Albert Lyon, 13881 W. Chicago Blvd., Detroit 28, Mich.

Filed June 2, 1955, Ser. No. 512,785

5 Claims. (Cl. 301—37)

The present invention relates to improvements in wheel structures and more particularly concerns the ornamental and protective covering of the outer sides of vehicle wheels.

In the automobile industry there is a continual search for new type ornamental cover designs which are capable of catching the public's eye. Of recent date a new demand has arisen in the industry for a very large type cover design possessing a massive appearance and having a deeply axially inset channeled or dished area in the cover to further high light the cover. It will be appreciated that there are limitations upon the depth to which sheet metal may be drawn without overstretching and rupturing of the material. Accordingly, where there is a demand for an unusually deep draw resort may have to be made to making the cover in two separable parts instead of making it as a one-piece unit.

It is, therefore, an object of the present invention to provide a wheel structure including a novel cover for the outer side thereof enabling the provision of an unusually deep draw portion.

Another object of this invention is to provide a novel two-part cover construction.

In each case where a new cover design has been developed the cover manufacturer is faced with an entirely new problem relative to providing adequate means for maintaining same on the automobile wheel.

Accordingly, it is a further object of this invention to provide novel means for retaining a cover on a wheel.

Other objects, features and advantages of the present invention will be readily apparent from the following detailed description taken in connection with the accompanying drawings illustrating a single embodiment in which:

Figure 1 is a fragmentary side elevational view of a vehicle wheel structure embodying features of the present invention; and Figure 2 is an enlarged fragmentary radial sectional view taken substatnially on the line II—II of Figure 1.

As seen in Figures 1 and 2, a wheel cover assembly 15 embodying features of the present invention is arranged for disposition at the outer side of a vehicle wheel including a disk spider wheel body 16 provided with an axially inwardly extending outer marginal flange 17 secured in any suitable fashion to a base flange 18 of a drop center multi-flanged tire rim 19. From the axially inner side of the marginal flange 18 of the wheel body 16, a side flange 20 extends generally radially inwardly merging with a generally axially outwardly extending intermediate flange 21 which in turn merges with a generally radially inwardly extending bolt-on body portion 22. It will be appreciated that flanges 17, 20 and 21 of the wheel body 16 define together a deeply axially inset flanged area or annular channel 23 for purposes that hereinafter will become apparent.

While the tire rim may support a pneumatic tire and tube assembly, in the present instance, in keeping with the modern trend, the tire rim is shown as supporting a tubeless tire 24 while a valve stem 24' (Figure 1) is carried by the tire rim 19 for inflating the tire.

According to the present invention the wheel cover 15 is constructed in two separable parts, comprising an inner or central high crown cover member 25 and an outer annular trim cover member 26. Construction of the cover members 25 and 26, and the relationship thereof to the wheel, is such that the cover members are retainingly engageable together in manually removable relation by retaining means 27 which are connected to the flange 20 of the wheel body 16 at the axially innermost area of the inset flanged area 23.

By preference, the inner or central cover member 25 is of generally circular form and of a diameter to overlie and conceal the wheel body 16. To this end, the cover member 25 includes an axially inset high crown area 28 with an elongated generally axially inwardly and radially outwardly sloping annular side wall 29. The side wall 29 terminates at its inner end in a generally radially outwardly extending annular flange 30 having a reinforcing beaded extremity 31. From Figure 2 it will now be apparent that the annular side wall 29 is adapted to project into the inset flanged area 23 in close proximity to flange 20 of the wheel body 16. Additionally, the side wall 29 terminates in the flange 30 which is of a diameter to approximately coextensively overlie the flange 20.

By preference, the outer cover member 26 includes a radially outer terminal flange 32, a first radially and axially inwardly extending intermediate flange 33, a second axially inwardly extending intermediate flange 34, and a radially inwardly extending flange 35, similar to flange 30. The flange 35 terminates in a beaded reinforcing centering extremity 36. It will be appreciated that the outer cover member or trim 26 is adapted to completely overlie the stepped rim flange 19 and together with the inner cover member 25 constitutes a massive appearing cover structure.

The flange 35 of the outer cover member 26 when in assembled relation is adapted to engage with flange 30 of the inner cover member 25 to define a relatively deep axial draw 37 which high lights and lends distinctiveness to the ornamental appearance of the cover. In other words, flanges 33, 34 and 35 of the outer cover member 26 along with flanges 29 and 30 of the inner cover member 25 together define a deeply axially inset annular channeled portion or axial draw 37.

Cover retaining or fastening means 27 includes a bolt 38 which is threaded at one end 39 and is preferably for reasons of ease of manufacture formed integral with the wheel body flange 20 by means of welding the stud bolt to the flange 20 or the like. The means 27 also includes a rounded nut 40 which is threadingly engageable with the bolt 38.

The stud bolt 38 has an intermediate flat shoulder 41 upon which the overlapping contiguous radial flanges may be bottomed thereby permitting body flange 20 to be more easily manufactured as opposed to requiring the body flange 20 to be of an exactly flat construction.

For retaining the cover assembly 15 on the wheel axially alignable slots 42 and 43 are provided in respective contiguous radial flanges 30 and 35 through which bolt 38 is adapted to project. Nut 40 is adapted to threadingly engage with the bolt to clampingly engage flanges 30 and 35 together against the flat shoulder 41 which is of an enlarged diameter as opposed to the threaded end 39 of the bolt to assist in maintaining the assembly on the wheel.

In addition, the axially outer beaded extremity which in the illustrated instance is bead 36 serves as an additional centering means since when the cover members are properly assembled the bead 36 nests in the shoulder defined by flanges 29 and 30. Thus, if the slots were slightly misaligned, beaded extremity 36 would serve to correctly align the cover members 25 and 26 with respect to one another.

While three nut and bolt or fastening assemblies 27 have been shown any suitable number may be utilized to secure the cover to the wheel. It will be appreciated that the fastening assembly 27 constitutes the sole means by which the cover assembly is retained on the wheel.

By virtue of the instant wheel and cover construction, a deeply inset axial cover portion may be retainingly carried in assembled relationship in the axially inset area of the wheel. If desired, instead of the overlapping cover flanges 30 and 35 being separable they may be permanently secured together as by welding or the like.

Application of the cover member 15 to the wheel may be effected by aligning the slots 42 and 43 with the bolts 38 and pressing same axially inwardly on the wheel. Thereafter the outer cover member 26 is aligned in the same manner and the bolt 40 is tightened to maintain the cover members 25 and 26 in firm engagement with the wheel. Removal of the cover members 25 and 26 may be effected through reversing the application procedure.

It will be understood that modifications and variations may be effected without departing from the scope of the novel concepts of the present invention.

I claim:

1. In a wheel structure including a tire supporting and wheel connecting member having a deeply axially inset flanged area, an inner and an outer cover member each having terminal portions capable of overlying one another in said deeply axially inset flanged area and defining a deep axial draw between same, said terminal portions having axially alignable slots therein, and a fastener carried by said deep axially inset flanged area capable of projecting through said axial slots in said overlying portions to hold same in unitary relation.

2. In a wheel structure including a tire supporting and wheel connecting member having a deeply axially inset flanged area, a cover including an inner cover member and an outer cover member each having terminal portions capable of overlying one another in said deeply axially inset flanged area and defining a deep axial draw between same, said terminal portions having axially alignable slots therein, and a fastener on said deeply axially inset flanged area capable of projecting through said axial slots in said overlying portions to hold same in unitary relation, said fastener including a threaded bolt connected at one end to said deeply axially inset area and a nut capable of being threaded from the outside of the cover onto the bolt.

3. In a wheel structure including a tire supporting and wheel connecting member having a deeply axially inset flanged area, an inner and an outer cover member each having flange portions overlapped with respect to one another in said deeply inset flanged area and defining a deep axial draw between same, at least one of said flange portions having a beaded extremity abutting against the other of the cover members centering the cover members with respect to one another, and a fastener secured at one end to said deeply axially inset flanged area and having its opposite end projecting through said cover members joining said overlying flanges in unitary relation.

4. In a wheel structure, a wheel including joined rim and body parts with the wheel having an annular inset area disposed axially inwardly of the bolt-on flange on the body part, a multi-part wheel cover assembly disposed in overlying relation upon the wheel including an annular deeply dished area extending into the annular inset area axially inwardly of the bolt-on flange, and detachable retaining means in the inset area holding the cover assembly in retained detachable assembly upon the wheel, the cover assembly including an inner circular cover member and an outer ring member, the cover and ring members having their adjacent margins lapped at the annular deeply dished area and with the detachable retaining means cooperable with the lapped margins in maintaining the cover members in assembly together and in assembly with the wheel.

5. In a wheel structure, a wheel including joined rim and body parts with the wheel having an annular axially inwardly inset area disposed at the area where the rim and body parts are joined, a multi-part wheel cover assembly disposed in overlying relation upon the wheel substantially concealing the rim and body parts including an annular deeply dished area extending into the annular axially inwardly inset area at the area where the rim and body parts are joined, and detachable retaining means in the inset area holding the cover assembly in retained detachable assembly upon the wheel with the annular deeply dished area disposed in the axially inwardly inset area, the cover assembly including an inner circular cover member and an outer ring member with their adjacent margins lapped at the annular deeply dished area and with the detachable retaining means cooperating with the lapped margins and maintaining the cover members in assembly together and in assembly with the wheel.

References Cited in the file of this patent

UNITED STATES PATENTS

| | | |
|---|---|---|
| 2,012,449 | Hamilton | Aug. 27, 1935 |
| 2,386,236 | Lyon | Oct. 9, 1945 |
| 2,650,135 | Lyon | Aug. 25, 1953 |
| 2,683,629 | Lyon | July 13, 1954 |

FOREIGN PATENTS

| | | |
|---|---|---|
| 1,042,549 | France | June 3, 1953 |